United States Patent
Yoon et al.

(10) Patent No.: US 10,802,119 B2
(45) Date of Patent: Oct. 13, 2020

(54) LIDAR DEVICE AND METHOD OF MEASURING DISTANCE USING THE SAME

(71) Applicant: SAMSUNG ELECTRONICS CO., LTD., Suwon-si (KR)

(72) Inventors: Heesun Yoon, Incheon (KR); Jungwoo Kim, Hwaseong-si (KR); Tatsuhiro Otsuka, Suwon-si (KR); Inoh Hwang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 429 days.

(21) Appl. No.: 15/386,565

(22) Filed: Dec. 21, 2016

(65) Prior Publication Data

US 2018/0031681 A1 Feb. 1, 2018

(30) Foreign Application Priority Data

Jul. 26, 2016 (KR) .................. 10-2016-0094827

(51) Int. Cl.
*G01S 7/48* (2006.01)
*G01S 7/4865* (2020.01)
*G01S 17/10* (2020.01)
*G01S 17/89* (2020.01)

(52) U.S. Cl.
CPC ............ *G01S 7/4865* (2013.01); *G01S 17/10* (2013.01); *G01S 17/89* (2013.01)

(58) Field of Classification Search
CPC ......... G01B 11/02; G01S 17/10; G01S 7/481; G01S 17/00
See application file for complete search history.

(56) References Cited

U.S. PATENT DOCUMENTS

| | | | | |
|---|---|---|---|---|
| 5,054,911 A | * | 10/1991 | Ohishi | G01S 7/4818 356/5.07 |
| 5,940,170 A | * | 8/1999 | Berg | G01B 11/00 356/141.4 |
| 7,936,449 B1 | | 5/2011 | Bamji et al. | |
| 8,611,610 B2 | | 12/2013 | Park et al. | |
| 2004/0135992 A1 | * | 7/2004 | Munro | G01S 7/483 356/4.01 |
| 2008/0007709 A1 | | 1/2008 | Bamji et al. | |
| 2009/0115995 A1 | | 5/2009 | Bamji et al. | |
| 2013/0201183 A1 | | 8/2013 | Park et al. | |
| 2013/0300838 A1 | | 11/2013 | Borowski | |

(Continued)

FOREIGN PATENT DOCUMENTS

| | | |
|---|---|---|
| JP | 3572394 B2 | 9/2004 |
| JP | 5581174 B2 | 8/2014 |
| KR | 10-2011-0085785 A | 7/2011 |

*Primary Examiner* — Luke D Ratcliffe
(74) *Attorney, Agent, or Firm* — Sughrue Mion, PLLC

(57) ABSTRACT

A lidar device includes a light source configured to emit a laser pulse to an object, a light receiver configured to receive the laser pulse reflected by the object, a first periodic wave generator configured to generate a first periodic wave when the light source emits the laser pulse and generate a second periodic wave when the light source receives the laser pulse, and a first comparator configured to compare a phase of the first periodic wave and a phase of the second periodic wave to each other. The lidar device calculates a distance between the lidar device and the object based on a phase difference determined by the first comparator.

14 Claims, 12 Drawing Sheets

(56) References Cited

U.S. PATENT DOCUMENTS

| | | |
|---|---|---|
| 2014/0071432 A1 | 3/2014 | Dunne |
| 2014/0226166 A1 | 8/2014 | Kumar et al. |
| 2014/0232827 A1 | 8/2014 | Kumar et al. |
| 2014/0350836 A1* | 11/2014 | Stettner ................. G01S 17/931 701/301 |
| 2017/0115394 A1 | 4/2017 | Yoon et al. |

* cited by examiner

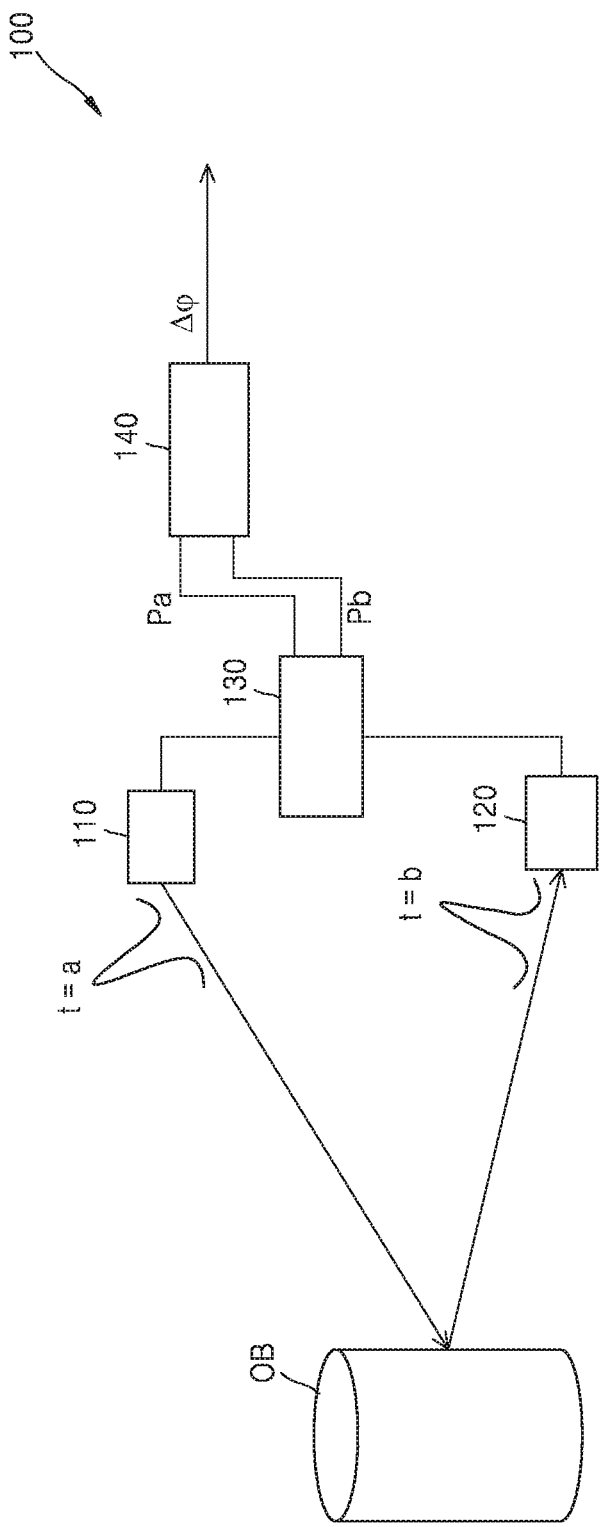

LIDAR DEVICE AND METHOD OF MEASURING DISTANCE USING THE SAME

CROSS-REFERENCE TO RELATED APPLICATION

This application claims priority from Korean Patent Application No. 10-2016-0094827, filed on Jul. 26, 2016, in the Korean Intellectual Property Office, the disclosure of which is incorporated herein in its entirety by reference.

BACKGROUND

1. Field

Apparatuses and methods consistent with exemplary embodiments relate to a lidar device and a method of measuring a distance using the same.

2. Description of the Related Art

A related art 3D camera may include a function for measuring distances from a plurality of points on an object to the 3D camera. Various algorithms have been developed to measure distances between the object and the 3D camera, and the algorithm of the 3D camera generally utilizes a Time-of-Flight (TOF) method.

SUMMARY

Provided are a lidar device and a method of measuring a distance using the same.

Additional aspects will be set forth in part in the description which follows and, in part, will be apparent from the description, or may be learned by practice of the presented example embodiments.

According to an aspect of an example embodiment, a lidar device includes a light source configured to emit a laser pulse to an object, a light receiver configured to receive the laser pulse reflected by the object, a first periodic wave generator configured to generate a first periodic wave when the light source emits the laser pulse and generate a second periodic wave when the light source receives the laser pulse, wherein a frequency of the first periodic wave and a frequency of the second periodic wave are equal, and a first comparator configured to compare a phase of the first periodic wave and a phase of the second periodic wave to each other, wherein the lidar device calculates a distance between the lidar device and the object based on a phase difference determined by the first comparator.

The light receiver may include an avalanche photo diode (APD) or a single photon avalanche diode (SPAD).

The light source may be a laser diode.

The lidar device may further include a counter configured to count the number of periods of the first periodic wave generated during a flight time of the laser pulse.

The lidar device may further include a second periodic wave generator configured to generate a third periodic wave when the light source emits the laser pulse and generate a fourth periodic wave when the light source receives the laser pulse, wherein a frequency of the third periodic wave is equal to a frequency of the fourth periodic wave and different from the frequency of the first periodic wave, and a second comparator configured to compare a phase of the third periodic wave and a phase of the fourth periodic wave, wherein the lidar device calculates a distance between the lidar device and the object based on a phase difference determined by the second comparator and the phase difference determined by the first comparator.

The lidar device may further include a controller configured to calculate a distance between the lidar device and the object based on the phase difference determined by the first comparator.

The lidar device may further include a counter configured to count the number of periods of the first periodic wave generated during a flight time of the laser pulse, wherein the controller determines an actual phase difference $\Phi=2*\pi*n+\Phi_1$ and calculates the distance between the lidar device and the object based on n number of periods of the first periodic wave generated during a flight time of the laser pulse emitted from the light source and received from the counter and a phase difference $\Phi_1$ between the first and second periodic waves received from the first comparator.

The light receiver may include a plurality of photodetectors arranged in a 2D array.

The first periodic wave generator may generate the second periodic wave each time the plurality of photodetectors receive the laser pulse, and the first comparator may calculate the distance between the lidar device and the object per pixel by comparing the phases of the first and second periodic waves to each other.

The lidar device may further include a plurality of counters configured to count the number of periods of the first periodic wave generated during a flight time of the laser pulse per pixel, and a counter array configured to respectively connect the plurality of counters to the plurality of photodetectors.

According to an aspect of another example embodiment, a method of measuring a distance using a lidar device includes emitting a laser pulse to an object and generating a first periodic wave at a first point in time, generating a second periodic wave having the same frequency as the first periodic wave at a second point in time of receiving the laser pulse reflected by the object, and calculating a distance between the lidar device and the object by comparing phases of the first and second periodic waves to each other.

The calculating the distance between the lidar device and the object may include deriving a phase difference between the first and second periodic waves, calculating the number of periods of the first periodic wave generated between the first and second points in time, and obtaining an actual phase difference and calculating the distance between the lidar device and the object based on the phase difference and the number of the periods.

The number of periods of the first periodic wave may be calculated by a counter.

The generating the first periodic wave may include generating, at the first point in time, a plurality of first periodic waves having frequencies different from each other, and the generating the second periodic wave may include generating, at the second point in time, a plurality of second periodic waves respectively having the same frequencies as the plurality of first periodic waves.

The calculating the distance may include deriving a plurality of phase differences by comparing phases of first and second periodic waves having the same frequency among the plurality of first periodic waves and the plurality of second periodic waves, and calculating the distance between the lidar device and the object by deriving the actual phase difference from the plurality of phase differences.

BRIEF DESCRIPTION OF THE DRAWINGS

The above and/or other aspects will become more apparent by describing certain exemplary embodiments, with reference to the accompanying drawings, in which:

FIGS. 1A and 1B are views of a lidar device and wave generation according to an example embodiment;

DETAILED DESCRIPTION

Figure 1B:
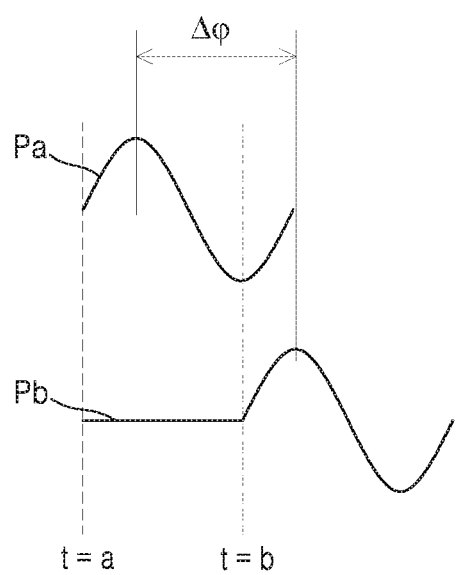

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

It will be understood that, although the terms first, second, etc. may be used herein to describe various elements, these elements should not be limited by these terms. These terms are only used to distinguish one element from another.

As used herein, the singular forms "a", "an", and "the" are intended to include the plural forms as well, unless the context clearly indicates otherwise. In addition, it will be understood that when a unit is referred to as "comprising" another element, it may not exclude the other element but may further include the other element unless specifically oppositely indicates.

FIG. 1A is a schematic view of a lidar device 100 according to an example embodiment. Referring to FIG. 1A, the lidar device 100 may include a light source 110, a light receiver 120, a periodic wave generator 130, and a comparator 140.

The light source 110 may be a light source device emitting light. For example, the light source 110 may emit infrared light. The infrared light may be prevented from being mixed with a natural visible light including sunlight. However, as well as the infrared light, the light source 110 may emit lights of wavelengths beyond those of infrared light. In this case, a correction for removing information about a mixed natural light may be required. For example, the light source 110 may be a laser light source. However, the light source 110 is not limited to a specific example. For example, the light source 110 may be any one of an edge-emitting laser, a vertical-cavity surface-emitting laser (VCSEL), and a distributed feedback laser. For example, the light source 110 may be a laser diode.

The light receiver 120 may be a photodetector receiving a laser pulse and outputting an electrical signal. For example, the light receiver 120 may include an avalanche photo diode (APD) or a single photon avalanche diode (SPAD). Circuit configurations of the light receiver 120 may vary depending on which photodetector of the APD and the SPAD is included in the light receiver 120, for example, a circuit configuration may be an analog front end (AFE) or a time digital counter (TDC). As the specific circuit configuration is commonly known to those of ordinary skilled in the art, detailed descriptions thereof will not be given herein.

The periodic wave generator 130 may generate a periodic wave. The periodic wave generator 130 may, for example, generated the periodic wave by variously adjusting frequency, amplitude, and a waveform of the generated periodic wave. For example, the periodic wave may include a sine wave and a triangular wave, and may further include any waveform including a certain frequency component.

The periodic wave generator 130 may be connected to the light source 110 and may generate a periodic wave when the light source 110 emits a laser pulse to an object OB. The periodic wave generator 130 may be connected to the light receiver 120 and may generate a periodic wave when the light receiver 120 receives a laser pulse reflected by the object OB. For example, referring to FIG. 1B, when the light source 110 emits a laser pulse to the object OB at a first point in time (t=a), the periodic wave generator 130 may generate a first periodic wave Pa having a frequency $f_1$ at the first point in time (t=a). For example, when the light receiver 120 receives a laser pulse at a second point in time (t=b), the periodic wave generator 130 may generate a second periodic wave Pb having the frequency $f_1$ at the second point in time (t=b).

The periodic wave generator 130 may transmit the generated first and second periodic waves Pa and Pb to the comparator 140. The periodic wave generator 130 may continuously transmit the first periodic wave Pa to the comparator 140 from the first point in time (t=a) until the second point in time (t=b). The comparator 140 may derive distance information by comparing phases of the first and second periodic waves Pa and Pb to each other.

The comparator 140 may derive a phase difference $\Delta\Phi$ by comparing the phases of the first and second periodic waves Pa and Pb to each other. When a distance between the lidar device 100 and the object OB is one period of a laser pulse or less, the phase difference $\Delta\Phi$ may correspond to an actual phase difference $\Phi$. When a distance between the lidar device 100 and the object OB exceeds one period of a laser pulse, the phase difference $\Delta\Phi$ may be different from the actual phase difference $\Phi$ due to phase ambiguity. In this case, the phase ambiguity may be removed by measuring the number of periods of a laser pulse included in the distance between the lidar device 100 and the object OB, or by comparing phase differences $\Delta\Phi$ between various frequencies to each other. Detailed descriptions thereof will be given in FIGS. 2A, 2B, 2C, 2D, 3A, and 3B.

The lidar device 100 may calculate the distance between the lidar device 100 and the object OB based on information about the actual phase difference $\Phi$ determined by the comparator 140. Calculation of the distance between the lidar device 100 and the object OB may be directly performed by the comparator 140 or by a separate controller (not shown). For example, the distance may be calculated by Equation 1:

$$l = \frac{\varphi}{4\pi} \cdot \frac{c}{f} \qquad \text{[Equation 1]}$$

In Equation 1, l indicates a distance between the lidar device 100 and the object OB, c indicates luminous flux, $\Phi$ indicates an actual phase difference, and f indicates a frequency of the periodic wave generated by the periodic wave generator 130.

Figure 2A:
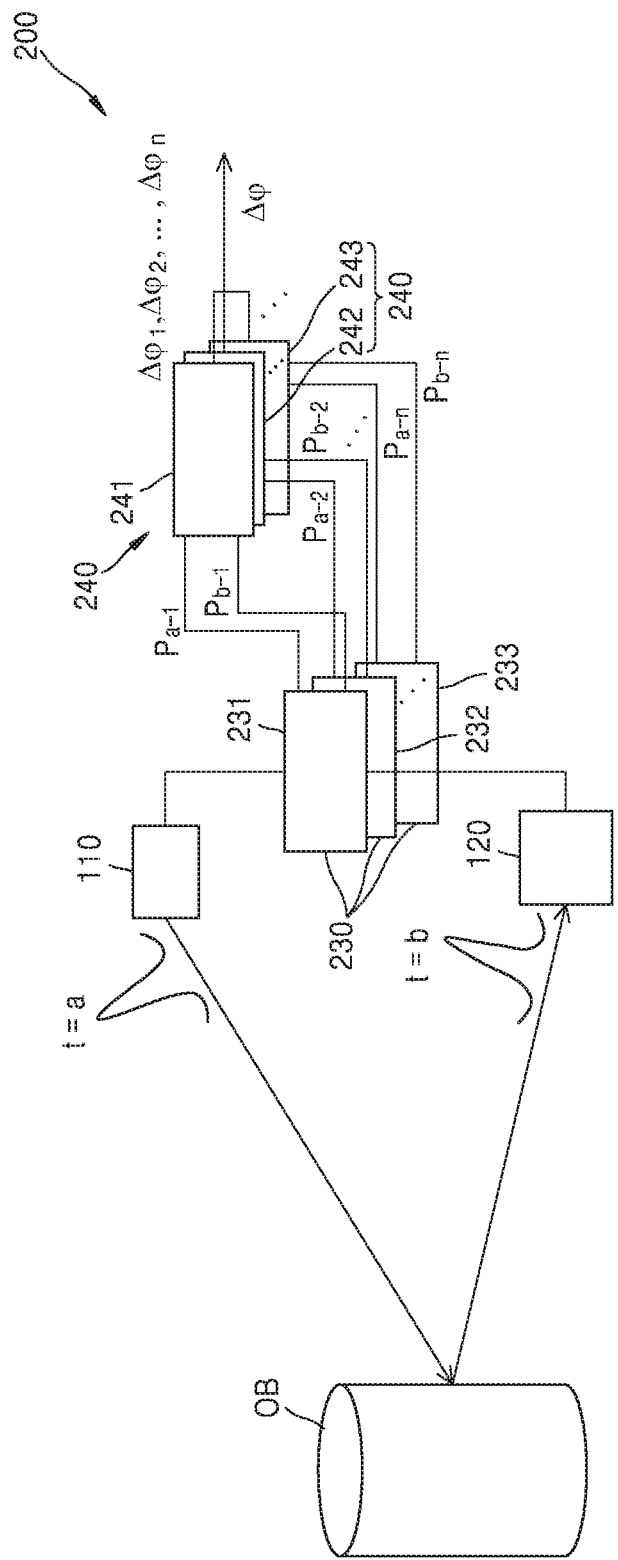
FIGS. 2A, 2B, 2C, and 2D are schematic views of a lidar device and wave generation according to another example embodiment.
Figure 2B:
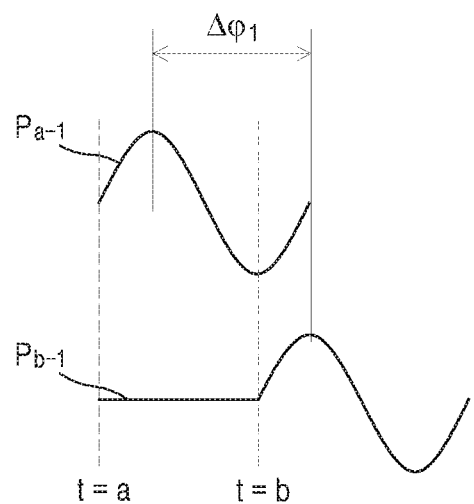
Figure 2C:
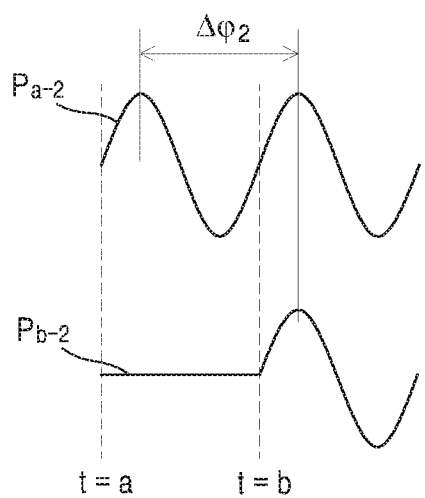
Figure 2D:
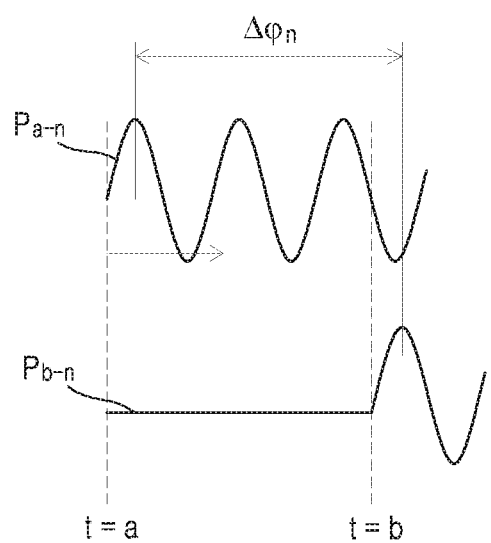

FIG. 2A is a schematic view of a lidar device 200 according to another example embodiment.

Referring to FIGS. 2A through 2D, the lidar device 200 may include a periodic wave generator 230 including periodic wave generation elements 231 to 233, and a comparator 240 including a plurality of comparators 241 and 242 to 243.

The periodic wave generator 230 may include a plurality of periodic wave generation elements 231 and 232 to 233. The periodic wave generation element 231 may generate a first periodic wave $P_{a-1}$ and a second periodic wave $P_{b-1}$ having the frequency $f_1$. The periodic wave generation element 232 may generate a first periodic wave $P_{a-2}$ and a second periodic wave $P_{b-2}$ having a frequency $f_2$. The periodic wave generation element 233 may generate a first periodic wave $P_{a-n}$ and a second periodic wave $P_{b-n}$ having a frequency $f_n$.

For example, the periodic wave generation element 231 may generate the first periodic wave $P_{a-1}$ at the first point in time (t=a) when the light source 110 emits a laser pulse to the object OB. The periodic wave generation element 231 may generate the second periodic wave $P_{b-1}$ at the second point in time (t=b) when the light receiver 120 receives a laser pulse. For example, the periodic wave generation element 232 may generate the first periodic wave $P_{a-2}$ at the first point in time (t=a) when the light source 110 emits a laser pulse to the object OB. The periodic wave generation element 232 may generate the second periodic wave $P_{b-2}$ at the second point in time (t=b) when the light receiver 120 receives a laser pulse. For example, the periodic wave generation element 233 may generate the first periodic wave $P_{a-n}$ at the first point in time (t=a) when the light source 110 emits a laser pulse to the object OB. The periodic wave generation element 233 may generate the second periodic wave $P_{b-n}$ at the second point in time (t=b) when the light receiver 120 receives a laser pulse.

The comparator 240 may include comparison elements 241 to 243. For example, the comparison element 241 may generate a phase difference $\Delta\Phi_1$ by receiving the first periodic wave $P_{a-1}$ and the second periodic wave $P_{b-1}$ having the frequency $f_1$ from the periodic wave generation element 231. For example, the comparison element 242 may generate a phase difference $\Delta\Phi_2$ by receiving the first periodic wave $P_{a-2}$ and the second periodic wave $P_{b-2}$ having the frequency $f_2$ from the periodic wave generation element 232. For example, the comparison element 243 may generate a phase difference $\Delta\Phi_n$ by receiving the first periodic wave $P_{a-n}$ and the second periodic wave $P_{b-n}$ having the frequency $f_n$ from the periodic wave generation element 233.

The lidar device 200 according to the present disclosure may derive the actual phase difference Φ even if a distance between the lidar device 200 and the object OB exceeds one period of a laser pulse. The lidar device 200 may derive the actual phase difference Φ by comparing the phase differences $\Delta\Phi_1, \Delta\Phi_2, \ldots,$ and $\Delta\Phi_n$ generated by the comparator 240 to each other. For example, the actual phase difference Φ may be directly derived by the comparator 240. For example, the lidar device 200 may include a separate controller (not shown) and may calculate a distance between the lidar device 200 and the object OB by deriving the actual phase difference Φ based on the phase differences $\Delta\Phi_1, \Delta\Phi_2, \ldots,$ and $\Delta\Phi_n$ received from the comparator 240.

Figure 3A:
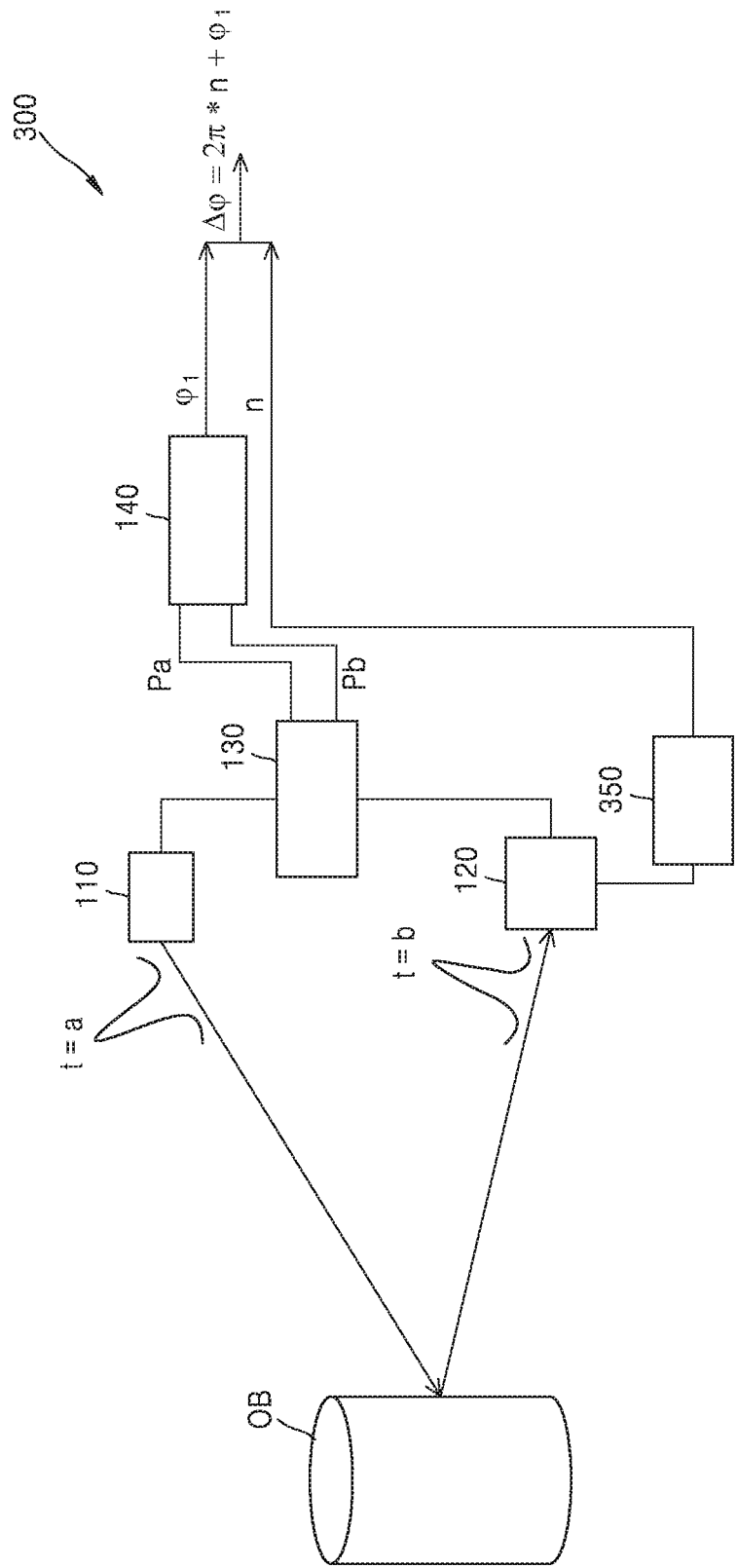
FIGS. 3A and 3B are schematic views of a lidar device and wave generation according to another example embodiment.

FIG. 3A is a schematic view of a lidar device 300 according to another example embodiment.

Referring to FIG. 3A, the lidar device 300 may include a counter 350. Since the other components are already described above with reference to the lidar device 100 (of FIG. 1A), repeated descriptions thereof will not be given herein.

Figure 3B:
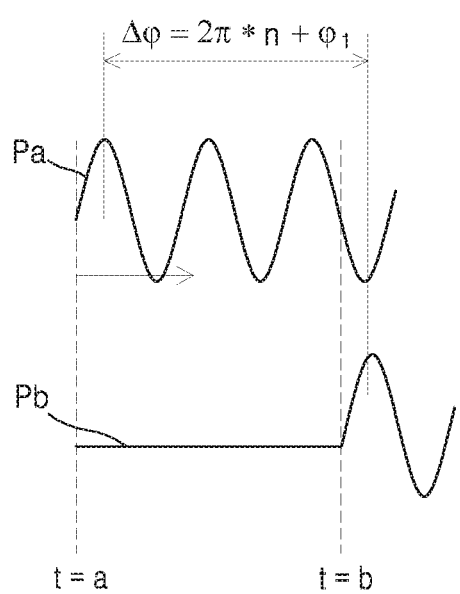

The counter 350 may count the number of periods of the first periodic wave Pa generated during a flight time of a laser pulse. For example, the counter 350 may count the number of periods of the first periodic wave Pa by directly measuring a time difference between transmission and reception of a laser pulse. Referring to FIG. 3B, the time difference is measured to derive the actual phase difference Φ from the phase difference ΔΦ when a distance between the lidar device 100 and the object OB exceeds one period of a laser pulse. In more detail, the actual phase difference Φ may be derived by Equation 2:

$$\varphi = 2\pi n + \Delta\varphi \qquad \text{[Equation 2]}$$

In Equation 2, Φ indicates an actual phase difference, ΔΦ indicates a phase difference obtained from the comparator 140, and n indicates the number of periods of the first periodic wave Pa measured by the counter 350.

For example, the counter 350 may be a counter using a related art TDC method. However, unlike a counter using a related art TDC method requiring a temporal resolution at a gigahertz level to achieve a precise resolution, the counter 350 according to the present disclosure may count the number of periods of the first periodic wave Pa only with a much lower temporal resolution because approximate calculation of a distance is required.

Figure 4:
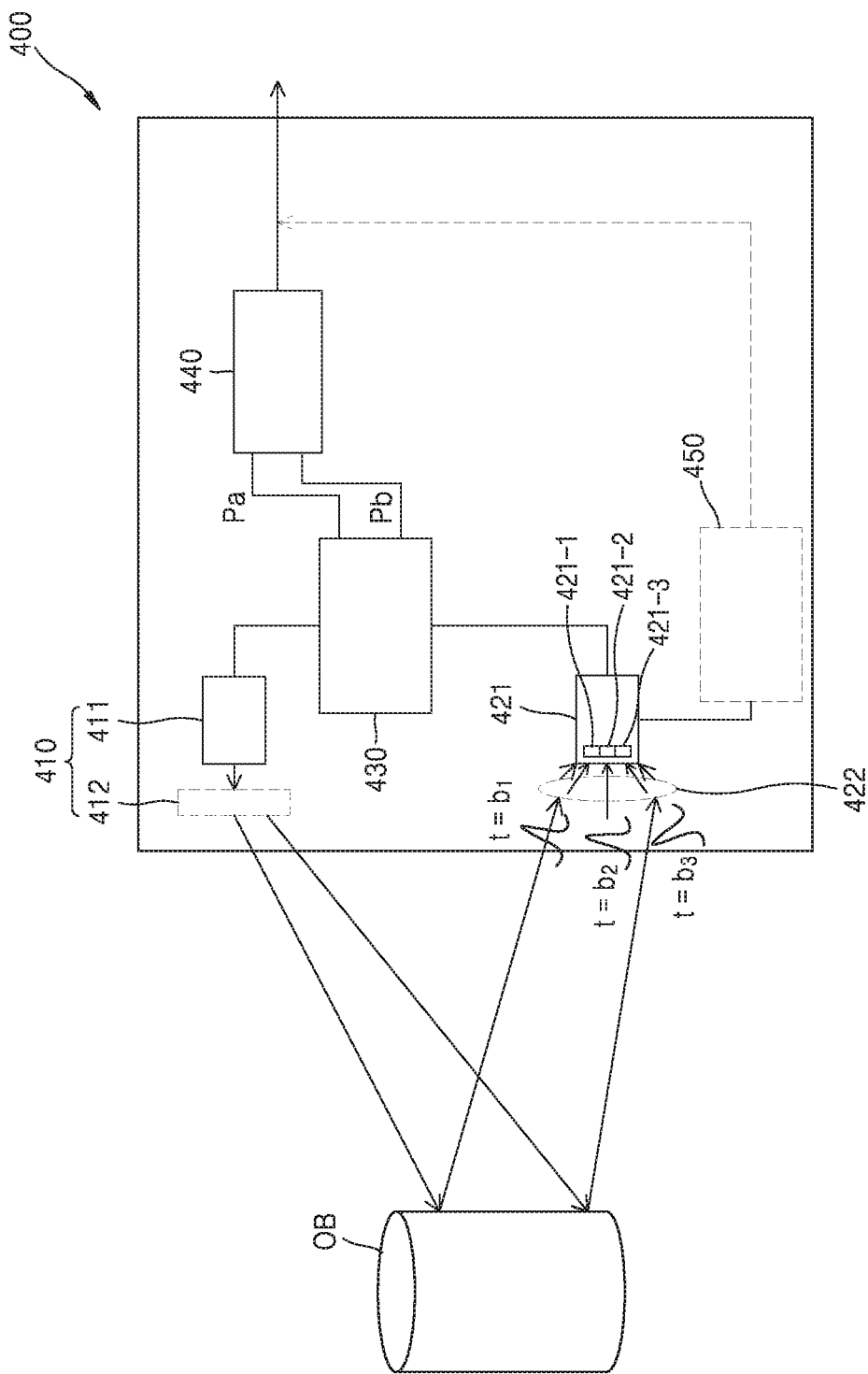
FIG. 4 is a schematic view of a lidar device according to another example embodiment.

FIG. 4 is a schematic view of a lidar device 400 according to another example embodiment. Referring to FIG. 4, the lidar device 400 may include a light source unit 410, a photodetector array 421, a periodic wave generator array 430, and a comparator array 440.

The light source unit 410 may include a light source 411 and an optical element 412 diffusing a laser pulse light emitted from the light source 411. For example, the optical element 412 may include a diffuser, a beam expander, or a lens. The light source unit 410 may obtain 3D depth information of the object OB by evenly emitting a laser pulse light to the object OB.

The photodetector array 421 may include a plurality of photodetectors arranged in a 2D array. For example, the photodetector array 421 may have a 2D array structure of an APD or an SPAD. For example, the photodetector array 421 may include photodetectors 421-1 and 421-2 through 421-3.

Each of the plurality of photodetectors included in the photodetector array 421 may correspond to a single image pixel. For example, a laser pulse received from the object OB may be transmitted to each of the plurality of photodetectors included in the photodetector array 421 according to a shape of the object OB at different points in time. The lidar device 400 may obtain 3D depth information from flight time information of the laser pulse transmitted to each of the plurality of photodetectors.

A lens unit 422 may be formed in front of the photodetector array 421 and may collect a laser pulse. For example, the lens unit 422 may be a biconvex lens.

The periodic wave generator array 430 may include a plurality of periodic wave generators. For example, each of the plurality of periodic wave generators included in the periodic wave generator array 430 may correspond to each of the plurality of photodetectors included in the photodetector array 421. For example, when each of the photodetectors receives a laser pulse, each of the plurality of periodic wave generators corresponding to each of the photodetectors may generate the second periodic wave Pb. For example, the periodic wave generator array 430 may generate a second periodic wave Pb at a second point in time ($t=b_1$) when the laser pulse is transmitted to a photodetector 421-1. For example, the periodic wave generator array 430 may generate a second periodic wave Pb at a second point in time ($t=b_2$) when the laser pulse is transmitted to a photodetector 421-2. For example, the periodic wave generator array 430 may generate a second periodic wave Pb at a second point in time ($t=b_3$) when the laser pulse is transmitted to a photodetector 421-3.

The comparator array 440 may include a plurality of comparators. For example, each of the plurality of comparators included in the comparator array 440 may correspond to each of the plurality of periodic wave generators included in the periodic wave generator array 430. For example, each of the plurality of comparators may obtain a phase difference from a difference between the first and second periodic waves Pb and Pa generated by each of the periodic wave generators corresponding to each of the plurality of comparators. The photodetector array 421 may receive a laser pulse reflected by the object OB, and points in time at which each of the plurality of photodetectors receive the laser pulse may vary because a flight time of the laser pulse is different depending on a shape of the object OB. Therefore, points in time at which each of the plurality of periodic wave generators corresponding to each of the plurality of photodetectors generate the second periodic wave Pb may vary. Accordingly, the comparator array 440 may compare second periodic waves Pb generated at different points in time with the first periodic wave Pa which is used as a reference, and may obtain a lidar image reflecting distance information of each pixel. For example, a flight time of the laser pulse regarding photodetector 421 may be $b_1$–a by comparing the first periodic wave Pa with the second periodic wave Pb generated at $t=b_1$. For example, a flight time of the laser pulse regarding photodetector 422 may be $b_2$–a by comparing the first periodic wave Pa with the second periodic wave Pb generated at $t=b_2$. For example, a flight time of the laser pulse regarding photodetector 423 may be $b_3$–a by comparing the first periodic wave Pa with the second periodic wave Pb generated at $t=b_3$.

A counter array 450 may count the number of periods of the first periodic wave Pa per pixel corresponding to each of the plurality of photodetectors of the photodetector array 421 during the flight time of the laser pulse. Furthermore, the counter array 450 may transmit the result to the comparator array 440.

The lidar device 400 according to the present disclosure may directly process the distance information of each pixel and a derivation of a lidar image by the comparator array 440, but the inventive concept is not limited thereto.

Figure 5:
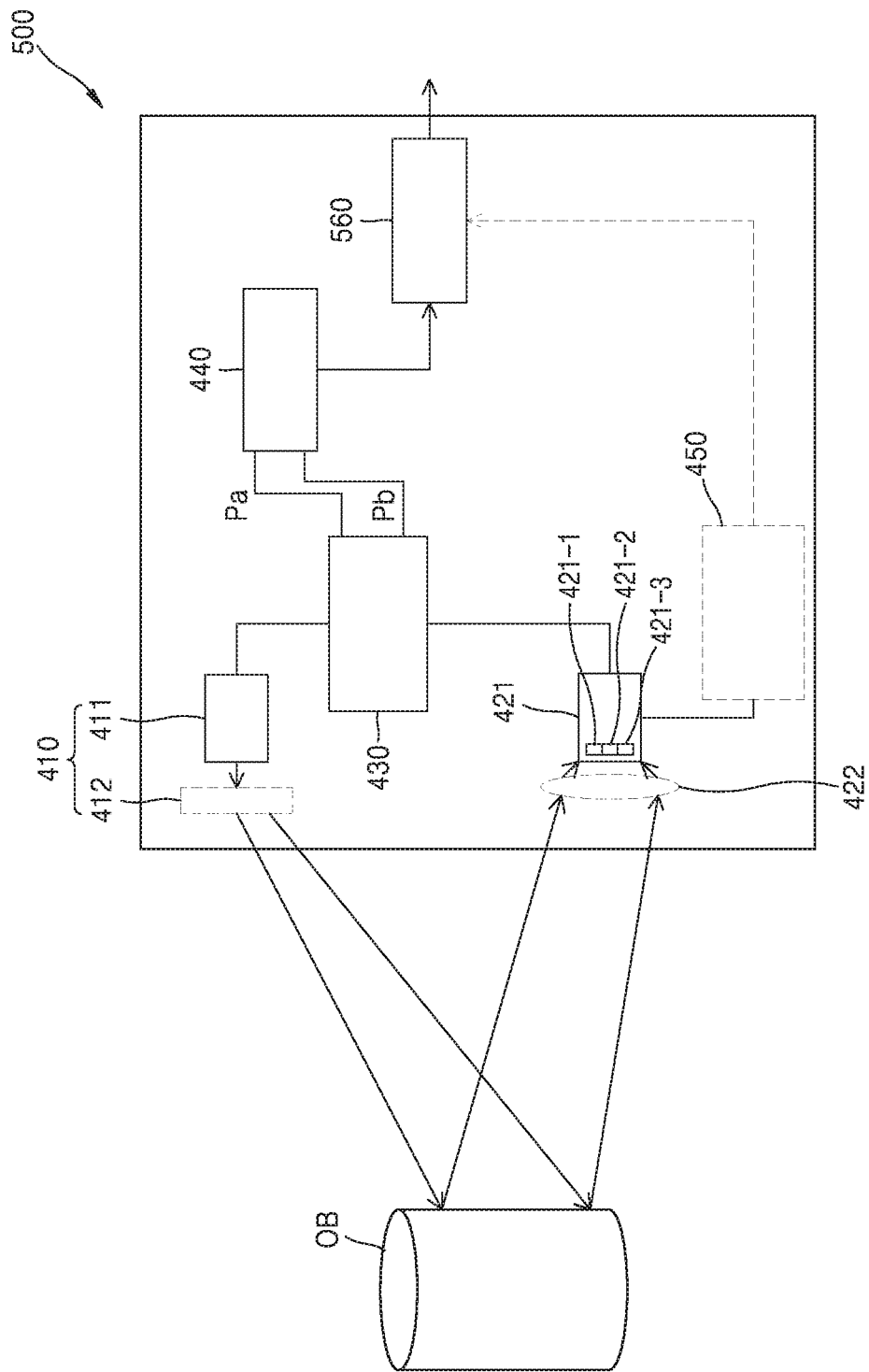
FIG. 5 is a schematic view of a lidar device according to another example embodiment.

FIG. 5 is a schematic view of a lidar device 500 according to another example embodiment. Referring to FIG. 5, the lidar device 500 may include a controller 560, i.e., a processor or a microprocessor. Since the other components are already described above with reference to the lidar device 400 (of FIG. 4), repeated descriptions thereof will not be given herein.

The controller 560 may derive the distance information of each pixel based on phase difference information, corresponding to each pixel, measured by the comparator array 440. The controller 560 may derive a lidar image based on the distance information of each pixel. For example, the controller 560 may receive a phase difference ΔΦ per pixel from the comparator array 440. As described above, when a distance between the lidar device 500 and the object OB is one period or more based on the first periodic wave Pa, it may be difficult to obtain the actual phase difference Φ only with the phase difference ΔΦ due to phase ambiguity. Therefore, the controller 560 may receive n number of periods of the first periodic wave Pa generated during a flight time of a laser pulse per pixel from the counter array 450 and may derive the actual phase difference Φ. Alternatively, for example, the controller 560 may overcome phase ambiguity by generating a plurality of frequencies in the periodic wave generator array 430 and may obtain the actual phase difference Φ. Since detailed descriptions of FIG. 5 are already described above in FIGS. 2A, 2B, 2C, 2D, 3A, and 3B, repeated descriptions thereof will not be given herein.

The controller 560 may transmit the determined actual phase difference Φ or a lidar image to the outside of the controller 560. The "outside" may indicate any electronic equipment such as personal computers, mobile phones, smart phones, or servers.

Figure 6:
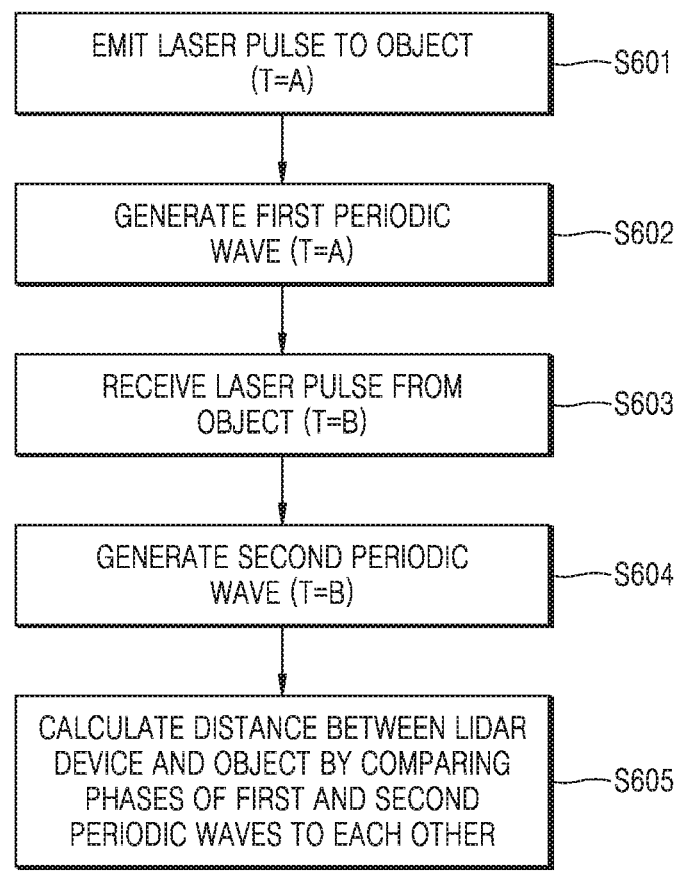
FIG. 6 is a schematic flowchart of a method of measuring a distance according to an example embodiment.

FIG. 6 is a schematic flowchart of a method of measuring a distance according to an example embodiment.

Referring to FIG. 6, in operation S601, a laser pulse may be emitted to an object at a first point in time ($t=a$). Since the laser pulse includes high energy for a short time period, the laser pulse may be emitted to the object with limited peak power, less than the amount which would otherwise cause eye damage.

In operation S602, a first periodic wave having a certain frequency may be generated at the first point in time ($t=a$). The first periodic wave is required to be continuously generated until a second point in time ($t=b$) when the laser pulse is transmitted to a lidar device. For example, the first periodic wave may have a sinusoidal waveform, but is not limited thereto. The first periodic wave may include all kinds of waveforms in which phase differences can be distinguished.

In operation S603, the laser pulse reflected by the object may be transmitted to the lidar device at the second point in time ($t=b$). As described above, when the lidar device 500 includes a plurality of photodetectors, the second point in time may vary per each of the photodetectors.

In operation S604, a second periodic wave having the same frequency as the first periodic wave may be generated at the second point in time. A distance between the lidar device and the object may be measured by comparing phases of the first and second periodic waves to each other, and thus it may be easy to measure the distance when frequencies or waveforms of the first and second periodic waves are identical.

In operation S605, the distance between the lidar device and the object may be calculated by comparing the phases of the first and second periodic waves to each other.

Figure 7:
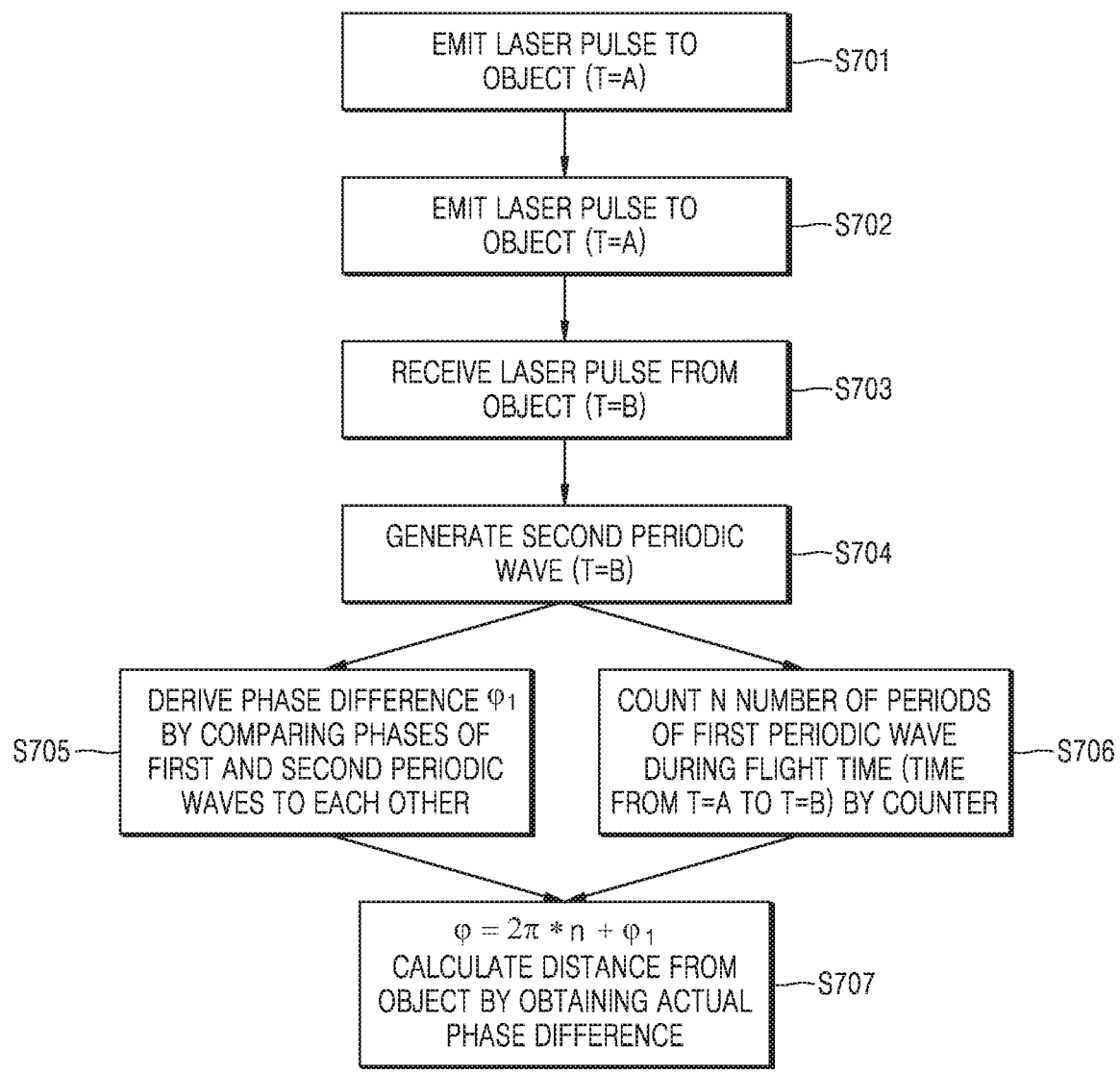
FIG. 7 is a schematic flowchart of a method of measuring a distance according to another example embodiment.

FIG. 7 is a schematic flowchart of a method of measuring a distance according to another example embodiment.

Referring to FIG. 7, in operation S701, a laser pulse may be emitted to an object at a first point in time ($t=a$).

In operation S702, a first periodic wave having a certain frequency may be generated at the first point in time ($t=a$).

In operation S703, the laser pulse reflected by the object may be transmitted to the lidar device at a second point in time ($t=b$).

In operation S704, a second periodic wave having the same frequency as the first periodic wave may be generated at the second point in time.

In operation S705, the phase difference $\Phi_1$ may be derived by comparing phases of the first and second periodic waves to each other. The phase difference $\Phi_1$ may be different from the actual phase difference Φ due to phase ambiguity.

Therefore, in operation S706, a counter may count n number of periods of the first periodic wave during a flight time (a time from t=a to t=b) of the laser pulse.

In operation S707, a distance from the object may be calculated by obtaining the actual phase difference Φ based on n number of periods of the first periodic wave and the phase difference $Φ_1$. The distance from the object may be calculated by Equation 2 described above.

Figure 8:
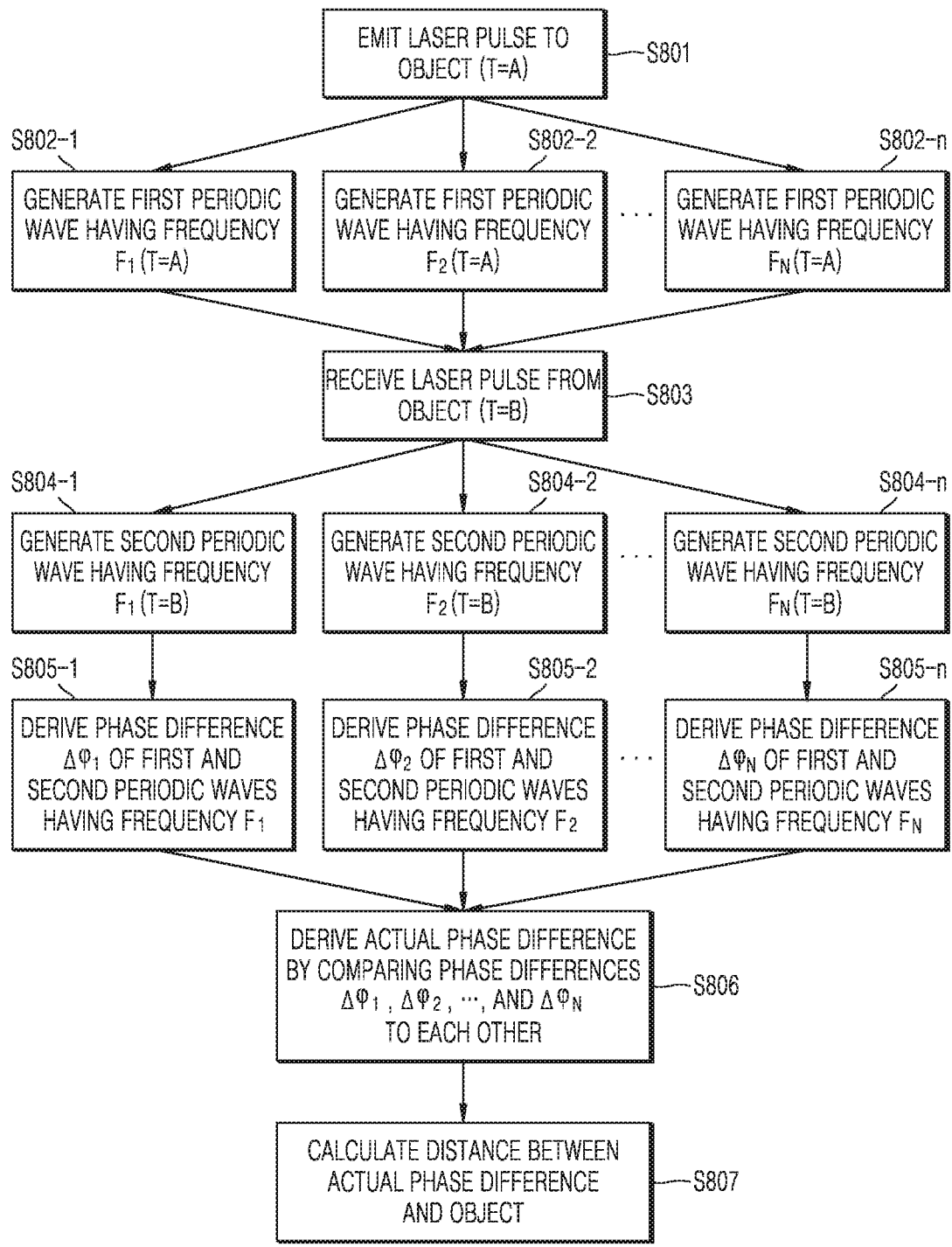
FIG. 8 is a schematic flowchart of a method of measuring a distance according to another example embodiment.

FIG. 8 is a schematic flowchart of a method of measuring a distance according to another example embodiment.

Referring to FIG. 8, in operation S801, a laser pulse may be emitted to an object at a first point in time (t=a).

Next, in S802-1, the first periodic wave $P_{a-1}$ having the frequency $f_1$ may be generated at the first point in time (t=a); in S802-2, the first periodic wave $P_{a-2}$ having the frequency $f_2$ may be generated at the first point in time (t=a); and in S802-n, the first periodic wave $P_{a-n}$ having the frequency $f_n$ may be generated at the first point in time (t=a).

In operation S803, the laser pulse reflected by the object may be transmitted to a lidar device at a second point in time (t=b).

Next, in S804-1, the second periodic wave $P_{b-1}$ having the frequency $f_1$ may be generated at the second point in time (t=b); in S804-2, the second periodic wave $P_{b-2}$ having the frequency $f_2$ may be generated at the second point in time (t=b); and in S804-n, the second periodic wave $P_{b-n}$ having the frequency $f_n$ may be generated at the second point in time (t=b).

Next, in S805-1, the phase difference $ΔΦ_1$ may be derived by comparing the first and second periodic waves $P_{a-1}$ and $P_{b-1}$ having the frequency $f_1$ to each other; in S805-2, the phase difference $ΔΦ_2$ may be derived by comparing the first and second periodic waves $P_{a-2}$ and $P_{b-2}$ having the frequency $f_2$ to each other; and in S805-n, the phase difference $ΔΦn$ may be derived by comparing the first and second periodic waves $P_{a-n}$ and $P_{b-n}$ having the frequency $f_n$ to each other.

In S806, phase ambiguity may be removed and the actual phase difference Φ may be derived by comparing the phase differences $ΔΦ_1$, $ΔΦ_2$, . . . , and $ΔΦ_n$ to each other.

In S807, a distance between the actual phase difference Φ and the object may be calculated.

The lidar device according to the present disclosure may overcome a limit on measuring distance due to output shortage of a related art phase modulation method, without requiring a TDC method having a higher temporal resolution compared to a direct Time-of-Flight (TOF) method using a related art laser pulse. For example, the lidar device according to the present disclosure may have both merits of the direct TOF method and the phase modulation method, and thus may be applied to short-range and long-range photography and at a high resolution.

According to the lidar device and the method of measuring distance using the same according to the present disclosure, a distance from an object at a long distance may be measured by using a Time-of-Flight method. Furthermore, the lidar device may obtain a precise resolution without a TDC having a high temporal resolution at a gigahertz level by comparing phases of periodic waves, which are generated when transmitting and receiving a laser pulse, to each other.

A plurality of periodic waves having frequencies different from each other may be generated and an actual phase difference may be derived by comparing phases of the plurality of periodic waves to each other due to phase ambiguity which occurs when a distance between the lidar device and the object exceeds one period of a periodic wave. Alternatively, an actual phase difference may be derived by counting the number of periods generated during a flight time of a laser pulse due to phase ambiguity.

It should be understood that descriptions of features or aspects within each embodiment should typically be considered as available for other similar features or aspects in other embodiments.

The foregoing exemplary embodiments and advantages are merely exemplary and are not to be construed as limiting. The present teaching can be readily applied to other types of apparatuses. The description of exemplary embodiments is intended to be illustrative, and not to limit the scope of the claims, and many alternatives, modifications, and variations will be apparent to those skilled in the art.

What is claimed is:

1. A lidar device comprising:
   a light source configured to emit a laser pulse to an object;
   a light receiver configured to receive the laser pulse reflected by the object;
   a first periodic wave generator connected to the light source and to the light receiver and configured to generate a first periodic wave when the light source emits the laser pulse at a first time point and generate a second periodic wave when the light receiver receives the laser pulse at a second time point, a frequency of the first periodic wave being equal to a frequency of the second periodic wave;
   a first comparator configured to, based a flight time of the laser pulse, determine a phase difference between the first periodic wave and the second periodic wave by comparing a phase of the first periodic wave with a phase of the second periodic wave;
   a processor configured to calculate a distance between the lidar device and the object based on the phase difference; and
   a counter configured to count a number of periods of the first periodic wave generated during the flight time of the laser pulse emitted from the light source,
   wherein the flight time is a time difference between the first time point and the second time point, and
   wherein the processor is further configured to calculate the distance between the lidar device and the object by determining an actual phase difference between the first periodic wave and the second periodic wave based on the number of periods of the first periodic wave received from the counter and the phase difference between the first periodic wave and the second periodic wave determined by the first comparator.

2. The lidar device of claim 1, wherein the light receiver comprises at least one from among an avalanche photo diode (APD) and a single photon avalanche diode (SPAD).

3. The lidar device of claim 1, wherein the light source comprises a laser diode.

4. The lidar device of claim 1, further comprising:
   a second periodic wave generator configured to generate a third periodic wave when the light source emits the laser pulse at the first time point and generate a fourth periodic wave when the light source receives the laser pulse at the second time point, a frequency of the third periodic wave being equal to a frequency of the fourth periodic wave and different from the frequency of the first periodic wave; and
   a second comparator configured to determine a phase difference between the third periodic wave and the fourth periodic wave by comparing a phase of the third periodic wave with a phase of the fourth periodic wave,
   wherein the processor is further configured to calculate the distance between the lidar device and the object based on the phase difference determined by the second comparator and the phase difference determined by the first comparator.

5. The lidar device of claim 4, wherein the counter is further configured to count a number of periods of the third periodic wave generated during the flight time of the laser pulse emitted from the light source, and
wherein the processor is further configured to calculate the distance between the lidar device and the object by determining an actual phase difference between the third periodic wave and the fourth periodic wave based on the number of periods of the third periodic wave received from the counter and the phase difference between the third periodic wave and the fourth periodic wave determined by the first comparator.

6. The lidar device of claim 5, wherein the processor is further configured to calculate the distance between the lidar device and the object by determining the actual phase difference as $\Phi=2*\pi*n+\Phi 1$,
wherein $\Phi$ is the actual phase difference,
$\Phi 1$ is the phase difference between the first periodic wave and the second periodic wave determined by the first comparator, and
n is the number of periods of the first periodic wave.

7. The lidar device of claim 1, wherein the light receiver comprises a plurality of photodetectors arranged in a two-dimensional (2D) array.

8. The lidar device of claim 7, wherein the first periodic wave generator is further configured to generate a plurality of second periodic waves each time each of the plurality of photodetectors receives the laser pulse, respectively, the second periodic wave being one of the plurality of second periodic waves,
the first comparator is further configured to determine phase differences between the first periodic wave and the plurality of second periodic waves by comparing the phase of the first periodic wave and phases of the plurality of second periodic waves, respectively,
the processor is further configured to calculate the distance between the lidar device and the object per pixel based on the phase differences, and
each of the plurality of photodetectors corresponds to one pixel.

9. The lidar device of claim 8, further comprising:
a counter array comprising counters coupled to the plurality of photodetectors, respectively, and configured to count a number of periods of the first periodic wave generated during a flight time of the laser pulse per pixel,
wherein the counter is one of the counters included in the counter array.

10. The lidar device of claim 1, wherein the first periodic wave generator is further configured to, in a time period from when the light source emits the laser pulse to when the light receiver receives the reflected laser pulse, continuously generate and transmit the first periodic wave to the first comparator.

11. A method of measuring a distance using a lidar device, the method comprising:
emitting a laser pulse to an object and generating a first periodic wave, at a first time point;
generating a second periodic wave having a same frequency as the first periodic wave at a second time point at which the laser pulse reflected by the object is received; and
calculating the distance between the lidar device and the object by comparing phases of the first periodic wave and the second periodic wave, based on a time between the first time point and the second time point,
wherein the calculating the distance between the lidar device and the object further comprises:
determining a phase difference between the first periodic wave and the second periodic wave by comparing a phase of the first periodic wave and a phase of the second periodic wave;
calculating a number of periods of the first periodic wave generated between the first time point and the second time point;
obtaining an actual phase difference based on the number of periods and the phase difference between the first periodic wave and the second periodic wave; and
calculating the distance between the lidar device and the object based on the actual phase difference.

12. The method of claim 11, wherein the number of periods of the first periodic wave is counted by a counter included in the lidar device.

13. The method of claim 11, wherein the generating the first periodic wave comprises generating, at the first time point, a plurality of first periodic waves having frequencies different from each other, and
the generating the second periodic wave comprises generating, at the second time point, a plurality of second periodic waves respectively having frequencies corresponding to the frequencies of the plurality of first periodic waves, respectively,
wherein the first periodic wave is one of the plurality of first periodic waves, and
the second periodic wave is one of the plurality of second periodic waves.

14. The method of claim 13, wherein the calculating the distance comprises:
determining a plurality of phase differences by comparing phases of first periodic waves and second periodic waves having the same frequency, among the plurality of first periodic waves and the plurality of second periodic waves, respectively; and
calculating the distance between the lidar device and the object by determining an actual phase difference from the plurality of phase differences.

* * * * *